United States Patent
Yu

(10) Patent No.: US 10,670,926 B2
(45) Date of Patent: Jun. 2, 2020

(54) SPACER PARTICLE DISTRIBUTION DEVICE

(71) Applicant: WUHAN CHINA STAR OPTOELECTRONICS SEMICONDUCTOR DISPLAY TECHNOLOGY CO., LTD., Wuhan, Hubei (CN)

(72) Inventor: Wei Yu, Hubei (CN)

(73) Assignee: WUHAN CHINA STAR OPTOELECTRONICS SEMICONDUCTOR DISPLAY TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/576,426

(22) PCT Filed: Oct. 26, 2017

(86) PCT No.: PCT/CN2017/107815
§ 371 (c)(1),
(2) Date: Nov. 22, 2017

(87) PCT Pub. No.: WO2019/019444
PCT Pub. Date: Jan. 31, 2019

(65) Prior Publication Data
US 2019/0033643 A1    Jan. 31, 2019

(51) Int. Cl.
| G02F 1/1339 | (2006.01) |
| G02F 1/13 | (2006.01) |
| B05B 5/03 | (2006.01) |
| B05B 5/025 | (2006.01) |
| B05C 19/00 | (2006.01) |

(52) U.S. Cl.
CPC .......... *G02F 1/13392* (2013.01); *B05B 5/025* (2013.01); *B05B 5/032* (2013.01); *G02F 1/1303* (2013.01); *B05C 19/00* (2013.01)

(58) Field of Classification Search
CPC .... G02F 1/1303; G02F 1/13392; B05C 19/00
USPC ........................................................ 349/155
See application file for complete search history.

(56) References Cited

U.S. PATENT DOCUMENTS

| 4,305,807 A | * | 12/1981 | Somlyody | ............... G02F 1/167 345/108 |
| 5,263,888 A | * | 11/1993 | Ishihara | ................ G02F 1/1341 349/190 |
| 5,838,413 A | * | 11/1998 | Matoba | ............... G02F 1/13394 349/155 |

(Continued)

FOREIGN PATENT DOCUMENTS

| CN | 1737671 A | 2/2006 |
| CN | 101676775 A | 3/2010 |

(Continued)

*Primary Examiner* — Karl Kurple

(57) ABSTRACT

The present disclosure provides a spacer particle distribution device used for distributing spacer particles toward a surface of a glass substrate and comprising: a sealed chamber, and a base, a lift pin and multiple adsorption assemblies disposed in the sealed chamber. The adsorption assemblies are disposed correspondingly on four edge regions of the base. Each adsorption assembly is electrified independently to respectively control electrostatic adsorption force of each adsorption assembly.

5 Claims, 2 Drawing Sheets

(56) References Cited

U.S. PATENT DOCUMENTS

| | | | | |
|---|---|---|---|---|
| 6,337,729 | B1* | 1/2002 | Morii | G02F 1/13392 |
| | | | | 349/155 |
| 6,618,112 | B1* | 9/2003 | Yoshimura | G02F 1/13394 |
| | | | | 349/155 |
| 7,038,655 | B2* | 5/2006 | Herb | G02F 1/167 |
| | | | | 345/107 |
| 7,910,175 | B2* | 3/2011 | Webber | C25D 5/02 |
| | | | | 359/296 |
| 8,797,302 | B2* | 8/2014 | Shinn | G02B 26/004 |
| | | | | 345/204 |
| 2003/0232561 | A1* | 12/2003 | Yawata | B32B 37/10 |
| | | | | 445/24 |
| 2005/0117110 | A1* | 6/2005 | Byun | G02F 1/1341 |
| | | | | 349/187 |
| 2006/0125776 | A1* | 6/2006 | Togano | G02F 1/167 |
| | | | | 345/107 |
| 2006/0209008 | A1* | 9/2006 | Nihei | G02F 1/167 |
| | | | | 345/107 |
| 2007/0029931 | A1* | 2/2007 | Kobayashi | G02F 1/1335 |
| | | | | 313/582 |
| 2007/0211018 | A1* | 9/2007 | Kaga | G02F 1/167 |
| | | | | 345/107 |
| 2008/0030843 | A1* | 2/2008 | Shoji | G02F 1/167 |
| | | | | 359/296 |
| 2008/0034797 | A1* | 2/2008 | Lee | B24B 13/015 |
| | | | | 65/61 |
| 2008/0062159 | A1* | 3/2008 | Roh | G02F 1/167 |
| | | | | 345/205 |
| 2009/0219521 | A1* | 9/2009 | Shin | G02F 1/1309 |
| | | | | 356/239.2 |
| 2010/0085528 | A1 | 4/2010 | Motomatsu | |
| 2010/0090928 | A1* | 4/2010 | Maeda | G02F 1/133707 |
| | | | | 345/4 |
| 2011/0085125 | A1* | 4/2011 | Kimura | B32B 41/00 |
| | | | | 349/187 |
| 2012/0058306 | A1* | 3/2012 | Miwa | C03C 3/091 |
| | | | | 428/141 |
| 2012/0069064 | A1* | 3/2012 | Yamakita | G02F 1/167 |
| | | | | 345/690 |
| 2012/0180947 | A1* | 7/2012 | Hada | B32B 41/00 |
| | | | | 156/249 |
| 2017/0359864 | A1* | 12/2017 | Leindecker | H05B 6/704 |
| 2018/0081110 | A1* | 3/2018 | You | G02B 6/0055 |
| 2018/0364522 | A1* | 12/2018 | Yamaguchi | G02F 1/133528 |

FOREIGN PATENT DOCUMENTS

| | | |
|---|---|---|
| CN | 102169258 A | 8/2011 |
| CN | 102654690 A | 9/2012 |
| CN | 105093707 A | 11/2015 |
| KR | 20120029038 A | 3/2012 |

\* cited by examiner

SPACER PARTICLE DISTRIBUTION DEVICE

BACKGROUND OF THE INVENTION

1. Field of the Invention

The present invention is related to a spacer material distribution machine, especially related to a spacer particle distribution device for a liquid crystal display panel manufacturing process.

2. Description of Prior Art

Manufacturing conventional liquid crystal display panel involves injecting liquid crystal molecules between two glass substrates each having electrodes, and an array substrate and an oppositely disposed color filter substrate. To maintain a certain thickness of a space between the array substrate and the color filter substrate, it is necessary to distribute evenly sized plastic material particles, to support a height between the two glass substrates such that the arranged liquid crystal molecules have stable refraction to increase display quality of the liquid crystal display panel.

However, conventional spacer particle distribution machines deliver spacer particles into a transport pipe using nitrogen. Each spacer particle having same sign electric charges after rubbing an inner wall of the pipe. After ejection from the pipe, these spacer particles with electric charges of the same sign repel one another and disperse such that the spacer particles are evenly distributed on a surface of the substrate. Meanwhile, electrifying an inner wall of a casing of a distribution machine to form static electricity of high voltage with electric charges of the same sign, relative to those of the spacer particles, causes the spacer particles distributed on the inner wall of the casing to bounce due to the same sign and to be distributed on the glass substrate. However, the particles on four edge regions of the substrate are accumulated, the height of the particles of one edge region is different from the height of the particles of other edge region. Distribution of the particles are not ideal, causing unevenly space thickness between the substrates, which further influences display quality of the crystal display panel.

SUMMARY OF THE INVENTION

The present invention provides a spacer particle distribution device that is able to adjust an accumulated thickness of spacer particles distributed around a glass substrate, to solve technical issues that in a traditional spacer particle distribution device, particles are easily accumulated on four edge regions of a glass substrate, a height of one or more edge regions is different from a height of other regions, and distribution of the particles is unideal to cause an uneven space thickness between the substrates and further influences displaying effect of the liquid crystal display panel.

To solve the aforementioned issues, the present invention provides technical solutions as follows.

The present invention provides a spacer particle distribution device used for distributing spacer particles toward a surface of a glass substrate and comprising:

a sealed chamber, an inner wall of the sealed chamber electrified to generate static electricity;

a base located in the sealed chamber, located on a bottom of the sealed chamber and used for bearing the glass substrate;

a lift pin located in the sealed chamber, disposed retractably on a surface of the base and used for lifting the glass substrate; and multiple adsorption assemblies located in the sealed chamber, disposed correspondingly on four edge regions of the base, each adsorption assembly electrified independently to respectively control electrostatic adsorption force of each adsorption assembly;

the adsorption assembly comprising an adsorption plate and an engaging member disposed on a bottom of the adsorption plate, a side of the engaging member engaged with an edge of the base, an end of the adsorption plate connected to the engaging member; and a sub plate disposed retractably on a side of the adsorption plate, a long side of the sub plate paralleling a long side of the adsorption plate.

According to a preferred embodiment of the present invention, the adsorption plate is disposed obliquely, an open angle is formed between the adsorption plate and one of the edge regions of the base at a position of the adsorption plate, and the open angle faces an outside of the edge of the base.

According to a preferred embodiment of the present invention, an end of the adsorption plate is articulated with an upper side of the engaging member, and a limiting member is disposed on an articulated portion between the adsorption plate and the engaging member.

According to a preferred embodiment of the present invention, the adsorption plate and the connected engaging member are formed by folding a same sheet metal.

According to a preferred embodiment of the present invention, the engaging member comprises an upper engaging plate, a lower engaging plate disposed opposite to the upper engaging plate and a side plate, one of two ends of the upper engaging plate and one of two ends of the lower engaging plate are connected securely by the side plate, the other end of the upper engaging plate is connected to an end portion of the adsorption plate.

According to a preferred embodiment of the present invention, a first engaging side is disposed at an inner upper end of the adsorption plate, a second engaging side is disposed on at inner lower end of the adsorption plate and parallels the first engaging side, the sub plate is slidably engaged between the first engaging side and the second engaging side.

According to a preferred embodiment of the present invention, a nozzle is disposed on an inner top end of the sealed chamber, the nozzle is connected to a pipe, an opposite end of the pipe opposite to the nozzle is connected to a spacer particle container, the spacer particle container includes nitrogen mixed in the spacer particle container.

According to a preferred embodiment of the present invention, an exhaust hole is defined in a bottom of the sealed chamber, an air valve is disposed on the exhaust hole of the sealed chamber.

The present invention also provides a spacer particle distribution device used for distributing spacer particles on a surface of a glass substrate and comprising:

a sealed chamber, an inner wall of the sealed chamber electrified to generate static electricity;

a base located in the sealed chamber, located on a bottom of the sealed chamber and used for bearing the glass substrate;

a lift pin located in the sealed chamber, disposed retractably on a surface of the base and used for lifting the glass substrate; and multiple adsorption assemblies located in the sealed chamber, disposed correspondingly on four edge regions of the base, each adsorption assembly electrified independently to respectively control electrostatic adsorption force of each adsorption assembly.

According to a preferred embodiment of the present invention, the adsorption assembly comprises an adsorption plate and an engaging member disposed on a bottom of the adsorption plate, a side of the engaging member is engaged with an edge of the base, an end of the adsorption plate is connected to the engaging member.

According to a preferred embodiment of the present invention, the adsorption plate is disposed obliquely, an open angle is formed between the adsorption plate and one of the edge regions of the base at a position of the adsorption plate, and the open angle faces an outside of the edge of the base.

According to a preferred embodiment of the present invention, an end of the adsorption plate is articulated with an upper side of the engaging member, and a limiting member is disposed on an articulated portion between the adsorption plate and the engaging member.

According to a preferred embodiment of the present invention, the adsorption plate and the connected engaging member are formed by folding a same sheet metal.

According to a preferred embodiment of the present invention, the engaging member comprises an upper engaging plate, a lower engaging plate disposed opposite to the upper engaging plate and a side plate, one of two ends of the upper engaging plate and one of two ends of the lower engaging plate are connected securely by the side plate, the other end of the upper engaging plate is connected to an end portion of the adsorption plate.

According to a preferred embodiment of the present invention, a nozzle is disposed on an inner top end of the sealed chamber, the nozzle is connected to a pipe, an opposite end of the pipe opposite to the nozzle is connected to a spacer particle container, the spacer particle container includes nitrogen mixed in the spacer particle container.

According to a preferred embodiment of the present invention, an exhaust hole is defined in a bottom of the sealed chamber, an air valve is disposed on the exhaust hole of the sealed chamber.

The advantageous effect of the present invention are as follows. In comparison to the spacer particle distribution device of the prior art, the spacer particle distribution device of the present invention adds an adsorption device on the base to adjust the edge regions of the base to acquire spacer particles with the even thickness. The technical issue of the spacer particle distribution device of the prior art that particles are easily accumulated on the four edger regions of the glass substrate, the height of one or more edge regions is different from the height of other edge regions and distribution of the particles is unideal to cause an uneven space thickness between the substrates and further influences displaying effect of the liquid crystal display panel are solved.

DESCRIPTION OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according the appended figures without any creative effort.

DETAILED DESCRIPTION OF THE PREFERRED EMBODIMENTS

Figure 1:
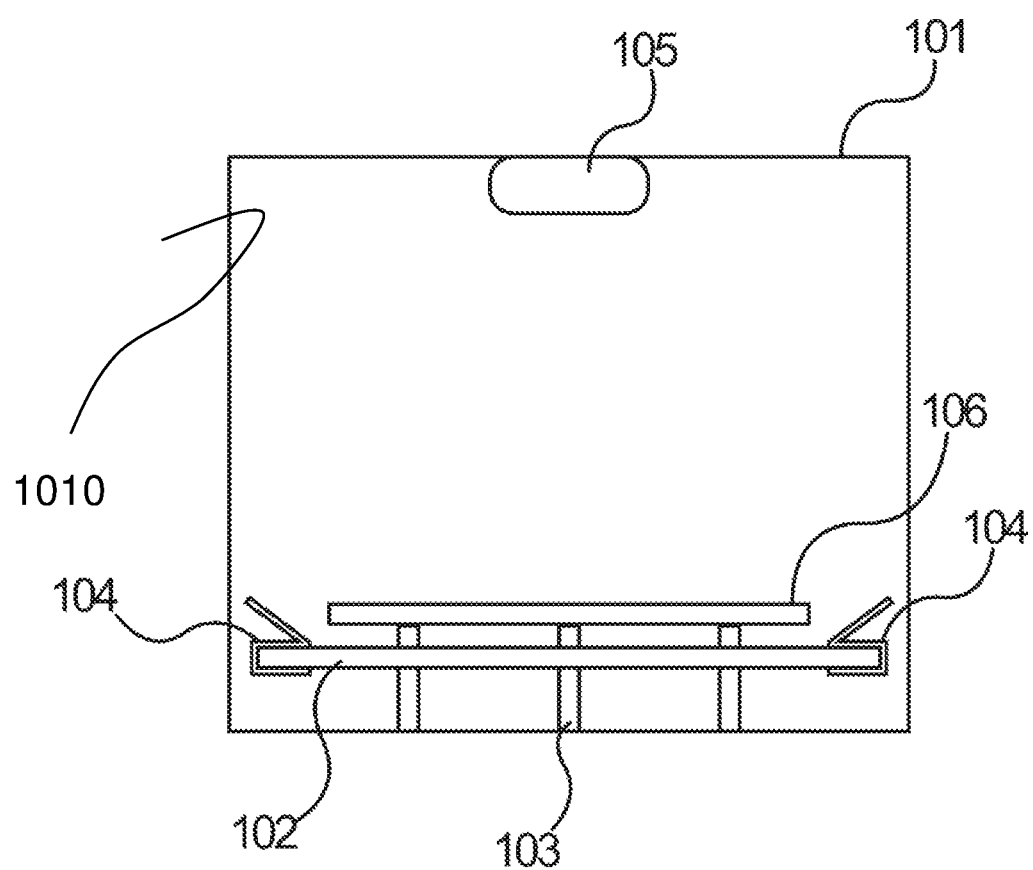
FIG. 1 is a schematic view of a spacer particle distribution device in accordance with the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface" and etc., only refer to the directions of the appended figures. Therefore, the terminologies of direction are used for explanation and comprehension of the present invention, instead of limiting the present invention. In the figures, units with similar structures are marked with the same reference numerals.

The present invention is aimed at the technical issue of the spacer particle distribution device of the prior art that particles are easily accumulated on the four edger regions of the glass substrate, the height of one or more edge regions is different from the height of other edge regions and distribution of the particles is unideal to cause an uneven space thickness between the substrates and further influences displaying effect of the liquid crystal display panel. The present embodiment is able to solve the aforementioned issues.

With reference to FIG. 1, the present invention provides a spacer particle distribution device used for distributing spacer particles on a surface of a glass substrate 106. The spacer particle distribution device comprises a sealed chamber 101, a base 102, a lift pin 103, and multiple adsorption assemblies 104 disposed in the sealed chamber 101.

Surrounding inner walls of the sealed chamber 101 are electrified to generate electrostatic adsorption force, and a nozzle 105 used for spraying spacer particles is disposed on an inner top end of the sealed chamber 101. A material feeding end of the nozzle 105 is connected to a transport pipe. An opposite end of the transport pipe opposite to the nozzle 105 is connected to a sealed container, the sealed container is injected with mixed spacer particles and nitrogen in the spacer particle container. The spacer particles are delivered into the nozzle 105 by passing nitrogen and other gas through the transport pipe. After being evenly sprayed by the nozzle 105, the spacer particles slowly descend in the sealed chamber 101 down to the surface of the glass substrate 106.

During transport of the spacer particles, the spacer particles rub the inner wall of the pipe to generate electric charges. Each spacer particle having same sign electric charges. When sprayed out from the pipe, the spacer particles repel one another and disperse due to having same sign electric charges. After the inner wall of the sealed chamber 101 is electrified, static electricity of high voltage with the same sign relative to that of the electric charges of the spacer particles is generated. The spacer particles drifting to the inner wall of the sealed chamber 101 bounces due to repulsion effect of the electric charges and finally falls into the edge regions of the glass substrate 106.

An exhaust hole is defined in a bottom of the sealed chamber 101 an air valve is disposed on the exhaust hole of the sealed chamber 101 and is used for exhausting the gas transporting the spacer particles.

The base 102 is disposed on the bottom of the sealed chamber 101 and is used for bearing the glass substrate 106. The base 102 is a metal base 102. The base 102 is also electrified. Polarities of static electricity of a surface of the base 102 and the spacer particles are the same such that the spacer particles are driven to fall to the glass substrate.

The lift pin 103 is disposed retractably on the surface of the base 102 and is used for lifting the glass substrate. When the glass substrate completes disposing a layer of the spacer particles, the lift pin 103 lifts the glass substrate, and the glass substrate is transferred to the next process by a robotic arm.

Each adsorption assembly 104 is disposed correspondingly on an edge region of the base 102 and is electrified independently to respectively control electrostatic adsorption force of each adsorption assembly 104. The adsorption assembly 104 electric charges of an opposite sign relative to a sign of the spacer particles. For the edge of the glass substrate deposited with more spacer particles, electrifying current on the region of the adsorption assembly 104 is increased to generate static electricity of high voltage, and redundant spacer particles are attracted from the surface of the glass substrate to the surface of the adsorption assembly 104.

Figure 2:
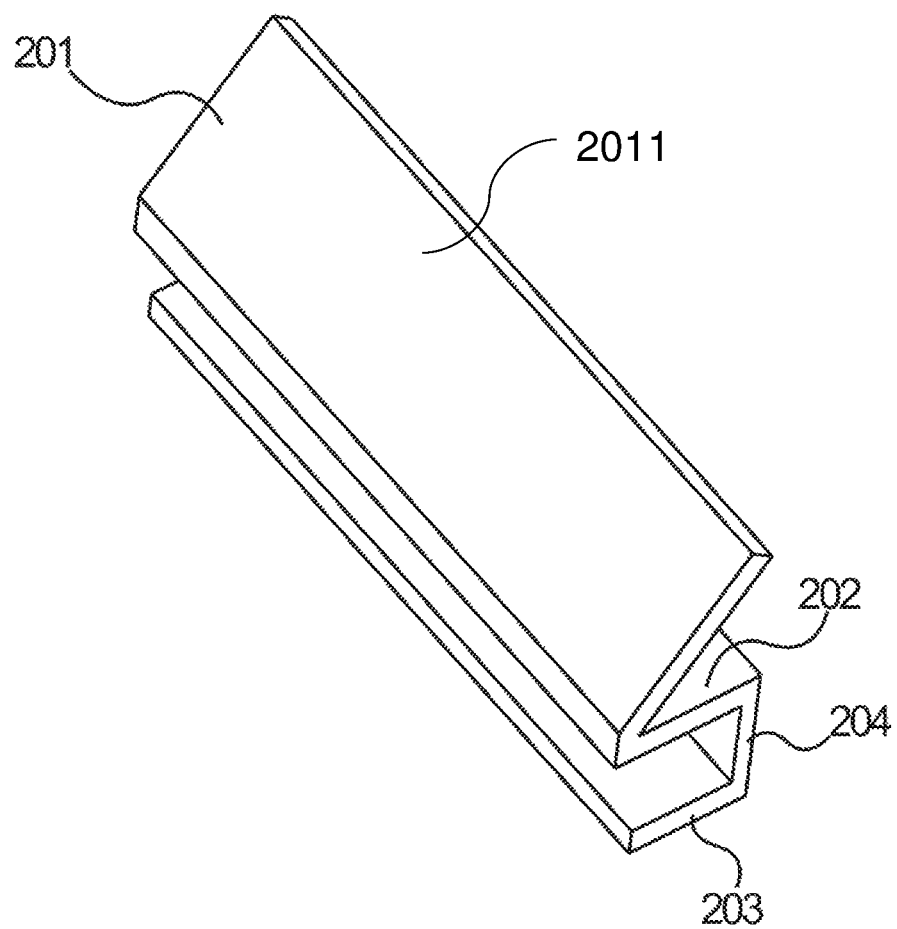
FIG. 2 is a schematic view of an adsorption assembly of the spacer particle distribution device in accordance with the present invention.

With reference to FIG. 2, the adsorption assembly comprises an adsorption plate 201, and an engaging member disposed on a bottom of the adsorption plate 201. A side of the engaging member is engaged with an edge of the base. An end of the adsorption plate 201 is connected to the engaging member.

The adsorption plate 201 is disposed obliquely, an open angle is formed between the adsorption plate 201 and one of the edge regions of the base 102 at a position of the adsorption plate 201. The open angle faces an outside of the edge of the base 102. By disposing the adsorption plate 201 obliquely, a surface of the adsorption plate 201 further approaches the edge regions of the glass substrate to attract the spacer particles of the edge regions of the glass substrate. Meanwhile, an oblique surface of the adsorption plate 201 is substantially parallel to a moving direction of the spacer particles bouncing from an inner wall 1010 of the sealed chamber 101 to the glass substrate, which enhances the interception of the spacer particles and prevents the spacer particles from drifting to the edge regions of the glass substrate.

An end of the adsorption plate 201 is articulated with an upper side of the engaging member, and a limiting member is disposed on an articulated portion between the adsorption plate 201 and the engaging member. Articulating end of the adsorption plate 201 with the upper side of the engaging member allows the adsorption plate 201 to spin relative to an edge of the engaging member serving as an axis. By adjusting the angle of the adsorption plate 201 according to different conditions, a better adsorption effect is obtained. The limiting member is used for fixing the angle of adsorption.

The adsorption plate 201 and the connected engaging member, are formed by a same sheet metal. The sheet metal is formed in one-step by a stamping process. Such manufacturing process is comparatively simple and saves manufacturing costs. Because the adsorption plate 201 and the engaging member are integrally formed, the angle of the adsorption plate 201 cannot be adjusted freely. A connection portion of the adsorption plate 201 and the engaging member employs pliable metal material, and the rest parts employ metal material with higher hardness such that the integrally formed adsorption assembly can be adjusted to change the angle of the adsorption plate 201.

The engaging member comprises an upper engaging plate 202, a lower engaging plate 203 disposed opposite to the upper engaging plate 202, and a side plate 204, one of two ends of the upper engaging plate 202 and one of two ends of the lower engaging plate 203 are connected securely by the side plate 204. The other end of the upper engaging plate 202 is connected to an end portion of the adsorption plate 201. A recess is defined on an inner side of the engaging member. The recess clamps the edge of the base. Preferably, a slide slot is defined in at least one side of the base and near the edge of the base. the engaging member. The engaging member has an engaging plate that is opposite to the slide slot of the edge of the base. A protrusion side is disposed on a side of the engaging plate. The protrusion side is connected to and matches the slide slot to further enhance fastening of the engaging member and the base.

A sub plate is disposed retractably on a side of the adsorption plate 201. A long side of the sub plate parallels the adsorption plate 201. Wherein, a first engaging side is disposed at the inner upper end of the adsorption plate 201. A second engaging side is disposed at an inner lower end of the adsorption plate 201 and parallels the first engaging side. The sub plate is slidably engaged between the first engaging side and the second engaging side. By the retractable sub plate, the adsorption plate 201 may be adjusted adaptively in length to be adapted for glass substrates of different sizes.

The advantageous effects of the present invention are as follows. In comparison to the spacer particle distribution device of the prior art, the spacer particle distribution device of the present invention adds an adsorption device on the base to adjust the edge regions of the base to acquire spacer particles with the even thickness. The technical issue of the spacer particle distribution device of the prior art that particles are easily accumulated on the four edger regions of the glass substrate, the height of one or more edge regions is different from the height of other edge regions and distribution of the particles is unideal to cause an uneven space thickness between the substrates and further influences displaying effect of the liquid crystal display panel is solved.

Although the preferred embodiments of the present invention have been disclosed as above, the aforementioned preferred embodiments are not used to limit the present invention. The person of ordinary skill in the art may makes various of changes and modifications without departing from the spirit and scope of the present invention. Therefore, the scope of protection of the present invention is defined by the scope of the claims.

What is claimed is:

1. A spacer particle distribution device used for distributing spacer particles on a surface of a glass substrate, the spacer particle distribution device comprising:
   a sealed chamber, an inner wall of the sealed chamber is electrified to generate static electricity;
   a base located in the sealed chamber, located on a bottom of the sealed chamber and used for bearing the glass substrate;
   a lift pin located in the sealed chamber, disposed retractably on a surface of the base and used for lifting the glass substrate; and
   multiple adsorption assemblies located in the sealed chamber, disposed correspondingly on edge regions of the base, each adsorption assembly electrified independently to respectively control electrostatic adsorption force of each adsorption assembly;

wherein each adsorption assembly comprises an adsorption plate and an engaging member disposed on a bottom of the adsorption plate, a side of the engaging member is engaged with an edge of the base, an end of the adsorption plate is connected to the engaging member, the adsorption plate comprises two opposite first sides and two opposite second sides;

wherein the adsorption plate is disposed obliquely relative to a corresponding edge of the base, an open angle is formed between the adsorption plate and the corresponding edge of the base, and the open angle faces in a direction of an outside of the edge of the base.

2. The spacer particle distribution device as claimed in claim 1, wherein an end of the adsorption plate is articulated with an upper side of the engaging member.

3. The spacer particle distribution device as claimed in claim 1, wherein the adsorption plate and the engaging member are formed by folding a sheet metal.

4. The spacer particle distribution device as claimed in claim 2, wherein the engaging member comprises an upper engaging plate, a lower engaging plate disposed opposite to the upper engaging plate and a side plate, one of two ends of the upper engaging plate and one of two ends of the lower engaging plate are connected securely by the side plate, the other end of the upper engaging plate is connected to an end portion of the adsorption plate.

5. The spacer particle distribution device as claimed in claim 1, wherein a nozzle is disposed on an inner top end of the sealed chamber.

* * * * *

UNITED STATES PATENT AND TRADEMARK OFFICE
CERTIFICATE OF CORRECTION

PATENT NO. : 10,670,926 B2
APPLICATION NO. : 15/576426
DATED : June 2, 2020
INVENTOR(S) : Wei Yu Page 1 of 1

It is certified that error appears in the above-identified patent and that said Letters Patent is hereby corrected as shown below:

On the Title Page

Column 1, item (30) foreign application priority data, please add the following:
(30) Foreign Application Priority Data
Jul. 25, 2017 (CN)     201710613734.0

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*